Patented May 13, 1924.

1,494,127

UNITED STATES PATENT OFFICE.

ERNST PREISWERK, OF BASLE, SWITZERLAND, ASSIGNOR TO THE HOFFMANN-LA ROCHE CHEMICAL WORKS, OF NEW YORK, N. Y., A CORPORATION OF NEW YORK.

COMPOUND OF ISOPROPYL ALLYL BARBITURIC ACID AND PROCESS FOR MAKING SAME.

No Drawing. Application filed November 15, 1921, Serial No. 515,333. Renewed October 23, 1923.

*To all whom it may concern:*

Be it known that I, ERNST PREISWERK, a citizen of Switzerland, and a resident of Basle, Switzerland, have invented certain new and useful Improvements in a Compound of Isopropyl Allyl Barbituric Acid and Process for Making Same, of which the following is a specification.

My invention relates to a compound of isopropylallylbarbituric acid and process for making same, which consists in melting down isopropylallylbarbituric acid with 1-phenyl-2, 3-dimethyl-4-dimethylamino-5-pyrazolone.

It has been found that isopropylallylbarbituric acid and 1-phenyl-2, 3-dimethyl-4-dimethylamino-5-pyrazolone form a new compound of peculiar properties. When melted down together the two colorless starting materials yield a yellow product whose melting point lies exactly between 92 and 93° C., provided that molecular parts have been used for the melting down. The reaction of the new compound towards solvents is varied. It is but slightly split up by carbohydrates; the solution obtained is of a deep yellow color. Solvents containing hydroxyl ions, especially water, yield slightly yellow solutions, which shows that in these solvents the compound is split up to a great extent. From such solutions it is possible to crystallize one of the two components without any admixture from the other. The new compound of isopropylallylbarbituric acid and 1-phenyl-2, 3-dimethyl-4-dimethylamino-5-pyrazolone is valuable, because it has been found, that for producing sleep smaller doses are needed than correspond with its content of isopropylallylbarbituric acid. It is of particular importance that the analgesic action of the new compound is a great deal stronger than that of the pure pyrazolone derivative; thus with the new compound it is generally possible to produce sleep even in cases where it is impaired by physical pain. The new compound may therefore partly replace the opiates.

The new compound may be obtained by melting down the two components in molecular proportions; when an excess of one or the other of the components is used the product is not homogenous, but consists of a mixture of the new compound with the component of which an excess has been used, and the melting point is accordingly different from that of the pure compound. Even when one of the components is used in excess the mixture is stable. Simple mixtures of the two components, especially in tablet form, discolor gradually owing to the formation of the new compound at the points of contact.

*Example.*

10 parts of isopropylallylbarbituric acid and 11 parts of 1-phenyl-2, 3-dimethyl-4-dimethylamino-5-pyrazolone are mixed and heated to 100–120°. A clear yellow molten mass is obtained which, while stirring, is left to cool. The solid compound is then powdered. The powder is distinctly yellow, its melting point lies exactly between 92 and 93° C. The powder is absolutely stable.

I claim:

As a new product the herein described compound of isopropylallylbarbituric acid and 1-phenyl-2.3-dimethyl-4-dimethylamino-5-pyrazolone, which can be obtained by melting down isopropylallylbarbituric acid with 1-phenyl-2.3-dimethyl-4-dimethylamino-5-pyrazolone, such new compound melting between 92 and 93° C., being but slightly split up by carbohydrates, and forming therewith solutions of a deep yellow color, and forming, with solvents containing hydroxyl ions, especially water, slightly yellow solutions.

In witness whereof I have hereunto set my hand.

ERNST PREISWERK.

Witnesses:
ALBERT A. HOFFMANN,
HENRY KUBLI.